United States Patent
Kramp et al.

(10) Patent No.: US 10,808,810 B2
(45) Date of Patent: Oct. 20, 2020

(54) ELECTRICALLY DRIVEN DEVICE

(71) Applicant: Braun GmbH, Kronberg (DE)

(72) Inventors: Andreas Kramp, Bad Camberg (DE); Thomas Fritsch, Eppstein (DE); Norbert Schaefer, Frankfurt am Main (DE)

(73) Assignee: Braun GmbH, Kronberg (DE)

( * ) Notice: Subject to any disclaimer, the term of this patent is extended or adjusted under 35 U.S.C. 154(b) by 0 days.

(21) Appl. No.: 15/715,095

(22) Filed: Sep. 25, 2017

(65) Prior Publication Data
US 2018/0087631 A1  Mar. 29, 2018

(30) Foreign Application Priority Data
Sep. 28, 2016 (EP) .................................... 16191023

(51) Int. Cl.
*A61C 1/18*  (2006.01)
*A45D 26/00*  (2006.01)
(Continued)

(52) U.S. Cl.
CPC ............. *F16H 21/40* (2013.01); *A61C 1/185* (2013.01); *A61C 17/221* (2013.01);
(Continued)

(58) Field of Classification Search
CPC . A61C 17/3481; A61C 1/185; A61C 17/3418; A61C 17/3427; F16H 21/40; H02K 7/075; A45D 26/0023
(Continued)

(56) References Cited

U.S. PATENT DOCUMENTS 3,233,265 A    2/1966  Hartmann
3,474,795 A   10/1969  Hantman
(Continued)

FOREIGN PATENT DOCUMENTS

DE    3544256 A1   6/1987
JP    H09177923    7/1997
(Continued)

OTHER PUBLICATIONS

European Search Report, dated Mar. 3, 2017; 8 pages.

*Primary Examiner* — Eduardo Colon Santana
*Assistant Examiner* — Devon A Joseph
(74) *Attorney, Agent, or Firm* — Vladimir Vitenberg

(57) ABSTRACT

An electrically driven device includes a housing, an electric motor with a drive shaft having a first rotary axis and a drive pin eccentrically connected to the drive shaft, and a driven shaft having a second rotary axis and mounted in the housing for a pivoting movement. The driven shaft is coupled to the drive pin by a gear mechanism converting a rotary motion of the drive shaft into the reciprocating pivoting of the driven shaft. The gear mechanism has first and second transmission stages, the former including a cross slider, and the latter an elastically deformable transmission member. The cross slider has a sliding support extending perpendicular to the first rotary axis and receiving the drive pin. The cross slider is axially guided in the housing to move in an axial direction perpendicular to the first rotary axis and perpendicular to the extension of the sliding support. A link, offset relative to the second rotary axis, connects the cross slider to the elastically deformable transmission member.

15 Claims, 5 Drawing Sheets

(51) Int. Cl.
*A61C 17/22* (2006.01)
*A61C 17/34* (2006.01)
*F16H 21/40* (2006.01)
*H02K 7/075* (2006.01)

(52) U.S. Cl.
CPC ........ *A61C 17/225* (2013.01); *A61C 17/3418* (2013.01); *A61C 17/3472* (2013.01); *A61C 17/3481* (2013.01); *H02K 7/075* (2013.01); *A45D 26/0023* (2013.01); *A45D 2026/0085* (2013.01); *A61C 17/3427* (2013.01)

(58) Field of Classification Search
USPC ........................................................ 318/119
See application file for complete search history.

(56) References Cited

U.S. PATENT DOCUMENTS

| | | | |
|---|---|---|---|
| 3,562,566 A | 2/1971 | Kircher | |
| 3,699,952 A * | 10/1972 | Waters | A46B 13/02 |
| | | | 601/18 |
| 4,506,400 A | 3/1985 | Klein | |
| 4,628,605 A | 12/1986 | Clowers | |
| 5,283,921 A | 2/1994 | Ng | |
| 5,311,633 A | 5/1994 | Herzog | |
| 5,381,576 A | 1/1995 | Hwang | |
| 5,689,850 A | 11/1997 | Shekalim | |
| 5,769,102 A * | 6/1998 | Zebuhr | A61C 15/047 |
| | | | 132/322 |
| 5,822,821 A * | 10/1998 | Sham | A46B 13/02 |
| | | | 15/22.1 |
| 5,974,615 A | 11/1999 | Schwarz-hartmann | |
| 6,237,178 B1 * | 5/2001 | Krammer | A46B 9/026 |
| | | | 15/22.1 |
| 6,363,565 B1 * | 4/2002 | Paffrath | A46B 9/04 |
| | | | 15/22.1 |
| 7,120,960 B2 * | 10/2006 | Hilscher | A61C 17/3472 |
| | | | 15/22.1 |
| 7,614,107 B2 * | 11/2009 | Cobabe | A46B 5/0075 |
| | | | 15/22.1 |
| 7,636,976 B2 * | 12/2009 | Banning | A61C 17/3436 |
| | | | 15/22.1 |
| 7,810,200 B2 | 10/2010 | Fujimoto et al. | |
| 7,861,348 B2 * | 1/2011 | Chan | A61C 17/349 |
| | | | 15/22.1 |
| 8,256,055 B2 | 9/2012 | Kressner | |
| 8,443,476 B2 * | 5/2013 | Hilscher | A61B 18/00 |
| | | | 15/22.1 |
| 8,701,235 B2 * | 4/2014 | Kressner | A61C 17/3472 |
| | | | 15/22.1 |
| 8,875,335 B2 | 11/2014 | Kloster et al. | |
| 8,943,634 B2 * | 2/2015 | Sokol | A61C 17/3481 |
| | | | 15/22.1 |
| 9,089,390 B2 * | 7/2015 | Klemm | A61C 17/22 |
| 2003/0131427 A1 | 7/2003 | Hilscher | |
| 2006/0027266 A1 | 2/2006 | Kim | |
| 2006/0101598 A1 | 5/2006 | Fujimoto | |
| 2010/0089414 A1 | 4/2010 | Wyatt | |
| 2012/0284937 A1 * | 11/2012 | Kloster | A61C 17/3418 |
| | | | 15/22.1 |
| 2015/0173874 A1 | 6/2015 | Johnson | |
| 2018/0087632 A1 | 3/2018 | Fritsch | |
| 2018/0087633 A1 | 3/2018 | Fritsch | |
| 2018/0091018 A1 | 3/2018 | Fritsch | |
| 2018/0091019 A1 | 3/2018 | Fritsch | |

FOREIGN PATENT DOCUMENTS

| | | |
|---|---|---|
| JP | 2001198145 | 7/2001 |
| JP | 2013226202 | 11/2013 |
| KR | 20080069373 | 7/2008 |
| WO | WO2011077285 | 6/2011 |

* cited by examiner

ELECTRICALLY DRIVEN DEVICE

FIELD OF THE INVENTION

The present invention is concerned with an electrically driven device, for example an electric toothbrush, an electric hair removal device or an electric skin treatment device.

BACKGROUND OF THE INVENTION

An electric toothbrush with a drive mechanism comprising gearwheels is known for example from DE 39 37 854 A1. The drive mechanism converts a continuous rotary movement of the drive shaft of an electric motor into a reciprocating pivoting of a driven shaft. EP 0 850 027 B1 and EP 1 357 854 B1 disclose further drive mechanisms with gearwheels wherein the mechanisms further generate an additional pivoting of the drive shaft about a swiveling axis. The use of gearwheels may contribute to increased sound emissions.

US 2006/0101598 A1 discloses an electric toothbrush with a scotch yoke mechanism converting a continuous rotary movement of the drive shaft of an electric motor into a reciprocating longitudinal displacement of a driven shaft.

Further, U.S. Pat. No. 5,381,576 describes an electric toothbrush comprising a housing, an electric motor with a drive shaft having a first rotary axis and a drive pin connected to the drive shaft eccentrically with respect to the rotary axis, and a driven shaft having a second rotary axis and mounted in the housing for performing a pivoting about the second rotary axis. The driven shaft is indirectly coupled to the drive pin by a gear mechanism converting a rotary motion of the drive shaft into a reciprocating pivoting of the driven shaft. The gear mechanism comprises an elastically deformable transmission member.

WO 2011/077285 A2 discloses an electrically driven toothbrush comprising a gear mechanism with a first transmission stage and a second transmission stage for converting a rotary motion of a drive shaft into a reciprocating pivoting of a driven shaft. The second transmission stage comprises a spring connected to a sleeve receiving a drive pin.

It is an object of the present disclosure to provide an electrically driven device with reduced sound emissions.

SUMMARY OF THE INVENTION

In accordance with one aspect there is provided an electrically driven device comprising a housing, an electric motor with a drive shaft having a first rotary axis and a drive pin connected to the drive shaft eccentrically with respect to the rotary axis, and a driven shaft having a second rotary axis and mounted in the housing for performing a pivoting about the second rotary axis. The driven shaft is indirectly coupled to the drive pin by a gear mechanism converting a rotary motion of the drive shaft into a reciprocating pivoting of the driven shaft. The gear mechanism comprises an elastically deformable transmission member. The gear mechanism comprises a first transmission stage and a second transmission stage, wherein the second transmission stage comprises the elastically deformable transmission member. The first transmission stage comprises a cross slider having a sliding support which extends perpendicular to the first rotary axis and which receives the drive pin either directly or by means of a sliding block having a bearing receiving the drive pin, and a link located offset with respect to the second rotary axis and connecting the cross slider to the elastically deformable transmission member. The cross slider is axially guided in the housing to be movable in an axial direction perpendicular to the first rotary axis and perpendicular to the extension of the sliding support. The eccentric drive pin may be directly connected to the drive shaft or may be indirectly connected to the drive shaft, e.g. by means of one or more interposed elements and/or a gear.

In accordance with a further aspect, an electrically driven device with a housing and a drive shaft having a first rotary axis comprises a driven shaft pivotably mounted in the housing by means of a rocker frame. The rocker frame may be pivotable with respect to the housing about a pivoting axis which is perpendicular to the first rotary axis. An elastically deformable element may be provided between the housing and the rocker frame biasing the rocker frame into a rest position in which the rocker frame abuts a first stop preventing pivoting of the rocker frame into a first direction.

DETAILED DESCRIPTION OF THE INVENTION

Figure 1:
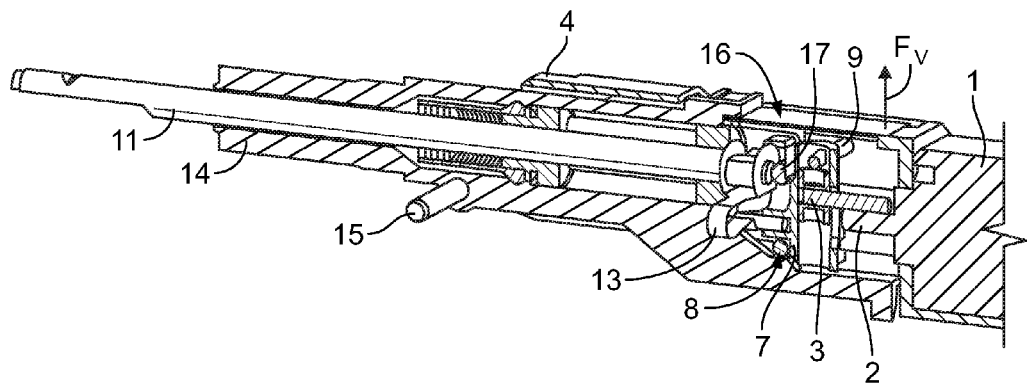
FIG. 1 shows a partial sectional view of a device according to a first embodiment.

Current toothbrush drive systems performing an oscillating pivoting of the cleaning element, e.g. a bristle, are perceived as being too loud. In particular, it is desirable to provide an electrically driven device with sound emissions below 55 dB(A) sound power level, especially at current drive frequency of 83 Hz. An important factor for noise is the form of the motion over time. The velocity is the first derivative of the displacement, the acceleration the second derivative of the motion. Higher accelerations and therefore inertia forces occur if the wave form is not a sine wave or harmonic. These periodic forces translate into bearing reaction forces and thus create an excitation to the structure of the device and this can cause undesired noise of elements oscillating in their natural frequency. Another source of noise is two bodies hitting each other and creating a rattling noise. This occurs for example in cam driven systems.

In accordance with one aspect, a gear mechanism is provided converting a rotary motion of the drive shaft into a reciprocating pivoting of the driven shaft, preferably a sinusoidal or a substantially sinusoidal movement of the driven shaft with lower maximum angular acceleration. This contributes in reducing the noise generated in use of the device.

According to an additional aspect, the gear mechanism comprises a first transmission stage and a second transmission stage. For example, in a first step a side to side motion is generated by the first transmission stage, whereas an oscillating motion of the driven shaft is generated in a second step by the second transmission stage. The side to side motion may be generated by the first transmission stage by means of a sliding block having a bearing receiving the drive pin and a cross slider having a sliding support which extends perpendicular to the first rotary axis and which receives the sliding block. A link which is arranged offset with respect to the second rotary axis may connect the cross slider to the elastically deformable transmission member of the second transmission stage. The cross slider is axially guided in the housing to be movable in an axial direction performing a reciprocating axial side to side motion perpendicular to the first rotary axis and perpendicular to the extension of the sliding support. The extension of the sliding support is understood to be the axial direction of the reciprocating movement of the sliding block in the cross slider during use of the device. The oscillating motion created in the cross slider is transmitted to the driven shaft by means of the elastically deformable transmission member of the second transmission stage.

The electrically driven device may further comprise a sliding block having a bearing receiving the drive pin. For example, the sliding block may be axially guided in the sliding support of the cross slider. In other words, the gear mechanism may work similar to the scotch yoke mechanism translating a continuous rotation of the drive pin into a reciprocating pivoting movement of the cross slider and of the driven shaft. As an alternative to the provision of a sliding block within the cross slider, the drive pin may directly engage the sliding support of the cross slider, e.g. having the form of a slotted hole.

The housing may be a single, unitary component part suitable for encasing and/or mounting further component parts of the device. In other embodiments, the housing may comprise different component parts, for example an outer shell, an insert, a chassis and/or a frame.

The first transmission stage of the gear mechanism may convert a continuous rotary motion of the drive shaft into a sinusoidal reciprocating displacement of the cross slider. For example, the lateral side to side displacement d of the cross slider may be calculated (neglecting possible play in bearings and couplings) based on the eccentricity e of the drive pin with respect to the rotary axis of the drive shaft depending on the angle of rotation phi of the drive shaft by the following equation:

$$d = e^* \operatorname{Sin}(phi) \qquad (1)$$

Thus, the cross slider is laterally displaced during one full rotation of the motor drive shaft between the values +e and −e in a sinusoidal manner The cross slider may be displaceably mounted in the housing by means of at least two stationary bars extending perpendicular to the first rotary axis and perpendicular to the extension of the sliding support. Thus, the cross slider with the link is guided to perform a pure axial side to side motion. The cross slider may have a cylindrical opening defining the sliding support of the sliding block with a long hole provided in the sliding support receiving the drive pin. This arrangement of the sliding block and the cross slider is an example for generating the side to side motion of the link based on a rotary motion of the drive shaft. As an alternative, the cross slider may have a polygonal opening or an opening with any other cross section suitable for guiding the sliding block.

Figure 7A:
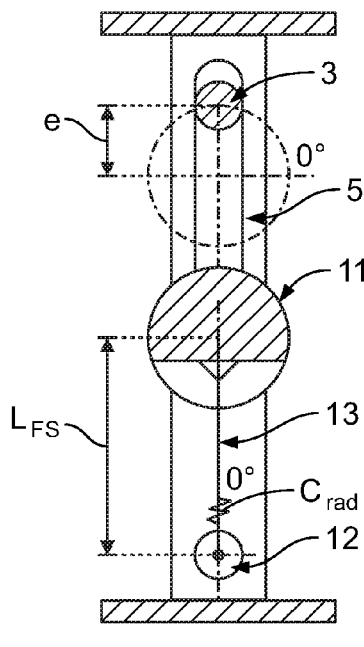
FIG. 7a, b shows the working principle of the device of FIG. 1 in different positions.
Figure 7B:
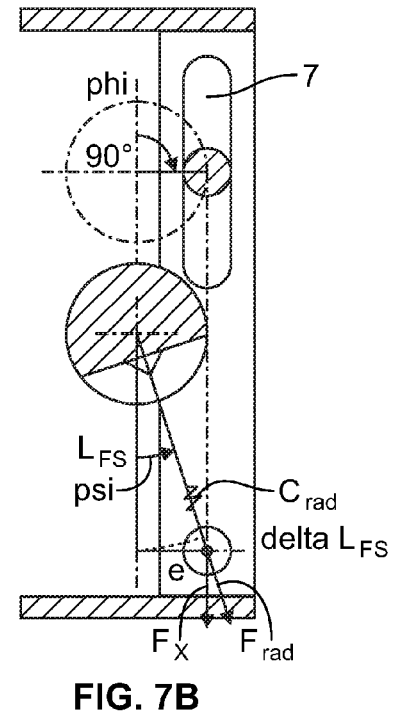

The elastically deformable transmission member may be a yoke which is rotationally constrained to the driven shaft, and which comprises a counter link connected to the link of the first transmission stage and located offset with respect to the second rotary axis. The counter link may be a pin constrained to the yoke with the link being a bearing cup receiving the pin or vice versa. With the second transmission stage comprising an elastically deformable transmission member and a counter link which is offset with respect to the second rotary axis of the driven shaft, the side to side motion of the link of the first transmission stage is translated into an oscillating pivoting about the second rotary axis of the driven shaft. With an offset $L_{FS}$ of the link and counter link with respect to the driven shaft, the maximum angle of rotation $psi_{max}$ of the driven shaft may be calculated for the maximum lateral displacement d of the cross slider being the eccentricity e (cf. equation 1) by the following equation (cf. FIG. 7):

$$psi_{max} = \operatorname{Arc} \operatorname{Tan}(e/L_{Fs}) \qquad (2)$$

In some embodiments, the maximum angle of rotation $psi_{max}$ of the driven shaft may be 20° with an eccentricity e of 1.7 mm and an offset $L_{FS}$ of 4.67 mm. As an alternative, the maximum angle of rotation $psi_{max}$ of the driven shaft may be 22.5° with an eccentricity e of 1.7 mm and an offset $L_{FS}$ of 4.1 mm.

The elastically deformable transmission member compensates the varying radial distance (offset $L_{FS}$) of the link and counter link from the second rotary axis of the driven shaft during operation of the device. The maximum amendment Delta $L_{FS}$ of the radial distance or offset may be calculated by the following equation (cf. FIG. 7):

$$\text{Delta } L_{FS} = L_{FS}/\operatorname{Cos}(psi_{max}) - L_{FS} \qquad (3)$$

For the above examples the value of Delta $L_{FS}$ is 0.3 mm and 0.34 mm, respectively. The yoke spring may have a radial stiffness $C_{rad}$ between 3 to 6 N/mm, for example between 4 to 5 N/mm, and a stiffness $C_{umf}$ in the direction of the lateral motion of the cross slider between 4 to 8 N/mm, for example between 5 to 7 N/mm. In some embodiments, it is preferred if the value of $C_{umf}$ exceeds the value of $C_{rad}$. However, the ratio of the values of $C_{umf}$ and $C_{rad}$ may be varied depending on the intended use of the device. The above examples are suitable for an electric toothbrush.

In some embodiments it may be desirable that the driven shaft not only performs an oscillating pivoting about the second rotary axis but rather performs a 3D motion, e.g. with a superimposed pivoting of the driven shaft. The gear mechanism may comprise a rocker frame which is pivotably mounted into a chassis or the device housing. Thus, a 3D motion is possible. For example, the driven shaft may be pivotably mounted in the housing by means of a rocker frame which is pivotable with respect to the housing about a pivoting axis which is perpendicular to the first rotary axis and perpendicular to the extension of the sliding support.

In accordance with one aspect, the above mentioned amendment Delta $L_{FS}$ of the radial distance or offset of the link and counter link from the second rotary axis of the driven shaft during operation of the device may be used for generating such a 3D motion. For example, radial stiffness $C_{rad}$ of the yoke spring generates an elastic force $F_{rad}$ in the radial direction of the driven shaft which force Fray has a component $F_X$ acting perpendicular to the first rotary axis and parallel to the extension of the sliding support (cf. FIG. 7b).

This force component $F_X$ raises druing rotation of drive shaft from the value zero at psi=0 to a maximum at both reversal points of the driven shaft, i.e. at $+\text{psi}_{max}$ and $-\text{psi}_{max}$, such that the force component $F_X$ pulsates with the double frequency of the motor rotation. In other words, the axial movement of the cross slider may generate an intermittent force or force component in a direction perpendicular to the axial movement of the cross slider due to the cross slider being coupled to the driven shaft by means of the link and the counter link which are offset from the second rotary axis of the driven shaft. This intermittent force may be transmitted to the rocker frame via the elastically deformable transmission member and the driven shaft.

An elastically deformable element, e.g. a spring, may be provided between the housing and the rocker frame biasing the rocker frame into a rest position or a zero position. This rest position may be defined by the rocker frame abutting a first stop. For example, the first stop prevents pivoting of the rocker frame into a first direction. One of the stationary bars may be the first stop. In accordance with one aspect, a spring is used to keep the rocker frame in its zero or rest position. This spring may be a leaf spring or a cylindrical (spiral) spring. A second stop may be provided limiting pivoting of the rocker frame into a second direction which is opposite to the first direction. The second stop may be a bar which is constrained to the housing and which may be located at the end of the driven shaft facing towards the motor. For example, the bar may be a metal pin assembled directly under the driven shaft to take up the forces created when dropping the device on the driven shaft. According to one aspect, the intermittent force $F_X$ biases the rocker frame away from the rest position. In other words, the intermittent force has a component which is directed opposite to the biasing force of the elastically deformable element.

The biasing force of the elastically deformable element may exceed the intermittent force generated by the cross slider. That is, the rocker frame is held in its rest position abutting against the first stop during use of the device if no additional external forces are applied to the device.

The rocker frame may be in a pulsating position (pulsating state) oscillating between the first stop and the second stop if a user force is exerted on the driven shaft with a magnitude between an upper threshold and a lower threshold. Thus, the rocker frame may be floating between the first stop and the second stop when in the pulsating position. According to one aspect, the rocker frame neither contacts the first stop nor the second stop in this pulsating position. When in the pulsating position, the rocker frame pivots about its pivot axis in an oscillating manner due to the intermittent force $F_X$ generated by the cross slider.

According to one aspect, the rocker frame pivots relative to the housing with a varying amplitude depending on the magnitude of a user force exerted on the rocker frame and the driven shaft, for example a contact pressure of a toothbrush to the user's teeth. The amplitude of the pivoting of the rocker frame may be zero below a lower threshold and above an upper threshold of the user force, the amplitude may be lower if the user force is shortly above the lower threshold or shortly below the upper threshold and the amplitude may be higher if the user force is significantly above the lower threshold and significantly below the upper threshold. For a toothbrush the lower threshold may be for example 0.5 N and the upper threshold may be for example 4 N. There may be a range of the magnitude of the user force in which the amplitude of the rocker frame has a maximum value. The lower amplitude may be caused by the rocker frame contacting one of the first stop or the second stop during pivoting.

The distance between the first stop and the second stop may be between 0.4 mm and 2 mm, for example between 0.6 mm and 1 mm. The radial stiffness $C_V$ of the elastically deformable element generates the biasing force $F_V$ as shown in FIG. 1. For example, the stiffness $C_V$ of the elastically deformable element may be between 1.9 N/mm to 5 N/mm, e.g. 4.4 N/mm.

The device may further comprise at least one sensor detecting contact of the rocker frame with one of the first stop and the second stop. For example, the rocker frame may contact a PCB mounted in the housing when abutting the first and/or second stop. This contact with a PCB may be used to measure and control the pressure applied by a user to the driven shaft, for example via a brush head of a toothbrush. The execution may be a threshold, where a switch is activated or a magnet and a hall sensor may be used to measure the displacement of the rocker frame. Other options include optical means or inductive proximity sensors. The travel of the rocker frame for activation of the pressure sensor may be in the range of <0.5 mm to 2 mm at a force of 0.5 to 4N.

The electrically driven device may comprise a standard DC motor. The motor may have a torque of at least 2 mNm, for example 2.5 mNm, at a speed of 4,800 to 7,200 rpm at a voltage of 3 to 4V. This voltage may be supplied by a Li-Ion battery or any other battery combination providing voltages above 3 V and low internal resistance. In addition or as an alternative, the motor may be connected to the mains supply.

In the embodiment depicted in FIG. 1 a portion of an electrically driven device in the form of an electric toothbrush is shown. The device comprises an electric motor 1 with a drive shaft 2 rotating during use. As shown in the enlarged view of FIG. 2, a pin 3 is eccentrically attached to the drive shaft 2. The motor 1 is constrained in a device housing 4 which is only partly visible in FIGS. 1 and 2. The housing 4 may be a single, unitary component part suitable for encasing and/or mounting further component parts of the device. In other embodiments, the housing may comprise different component parts, for example an outer shell, an insert, a chassis and/or a frame.

The pin 3 is coupled to a sliding block 5 such that the sliding block 5 follows movement of the pin 3. However, the pin 3 may be rotated within an aperture of the sliding block 5 which is guided in a sliding support 6 of a cross slider 7. The cross slider 7 is mounted in the housing 4 by means of two bars 8 and 9. The cross slider 7 comprises a link 10 in the form of a bearing cup for coupling the cross slider 7 to a driven shaft 11. The sliding block 5 and the cross slider 7 constitute a first transmission stage of a gear mechanism.

The link 10 receives a pin 12 as a counter link which is connected to the driven shaft 11 by means of a yoke spring 13. The design of the yoke spring 13 is shown for example in FIGS. 1, 4, 5a and 5b. The yoke spring 13 is rigidly attached to the driven shaft 11 preventing relative rotational and axial movement of the yoke spring 13 with respect to the driven shaft 11. In the embodiment depicted in the Figures, the yoke spring 13 comprises two bows extending from the driven shaft 11 which are both fixed to the pin 12. Thus, the pin 12 may be elastically displaced with respect to the driven shaft 11 in the radial direction of the driven shaft 11, i.e. the distance between the pin 12 and the driven shaft 11 may be varied against the elastic force of the yoke spring 13. The yoke spring 13 constitutes a second transmission stage of the gear mechanism.

The driven shaft 11 is rotatably guided in a rocker frame 14 which is pivotably mounted in the housing 4 by means of a bar 15. Pivoting of the rocker frame 14 about bar 15 with respect to the housing 4 is compensated by the yoke spring 13. A leaf spring 16 is arranged interposed between of the housing 4 and the rocker frame 14. A further bar 17 is constrained in the housing 4 at a position abutting or in close contact with the driven shaft 11 at the end of the driven shaft 11 facing towards the motor 1.

Figure 6:
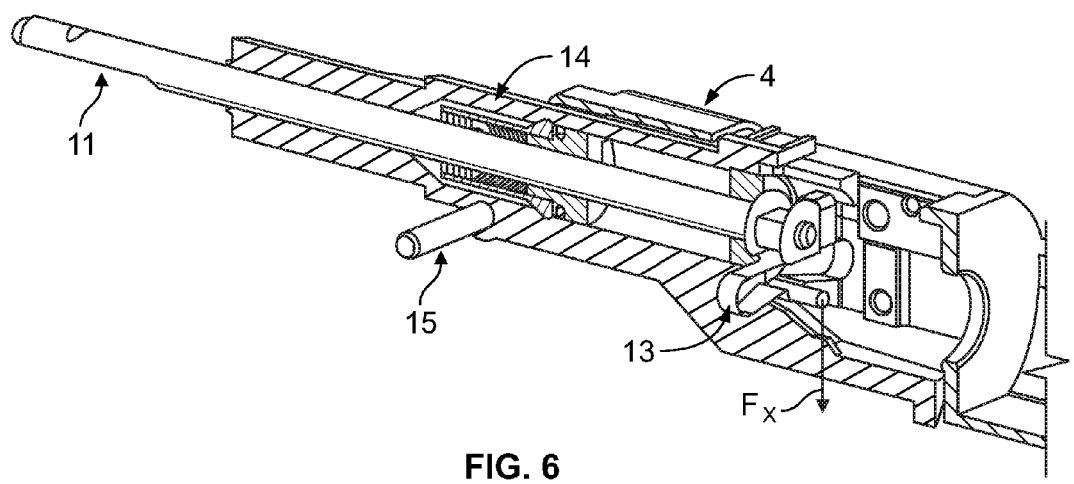
FIG. 6 shows a partial sectional view of the device of FIG. 1.

The rocker frame 14 is provided with an indicator 18 (cf. FIGS. 2 and 6) which may be provided with a magnet. The position of the magnet, i.e. the displacement of the rocker frame, may be detected by means of a hall sensor (not shown). As an alternative, the indicator may activate a switch, an optical detector or an inductive proximity sensor.

Figure 2:
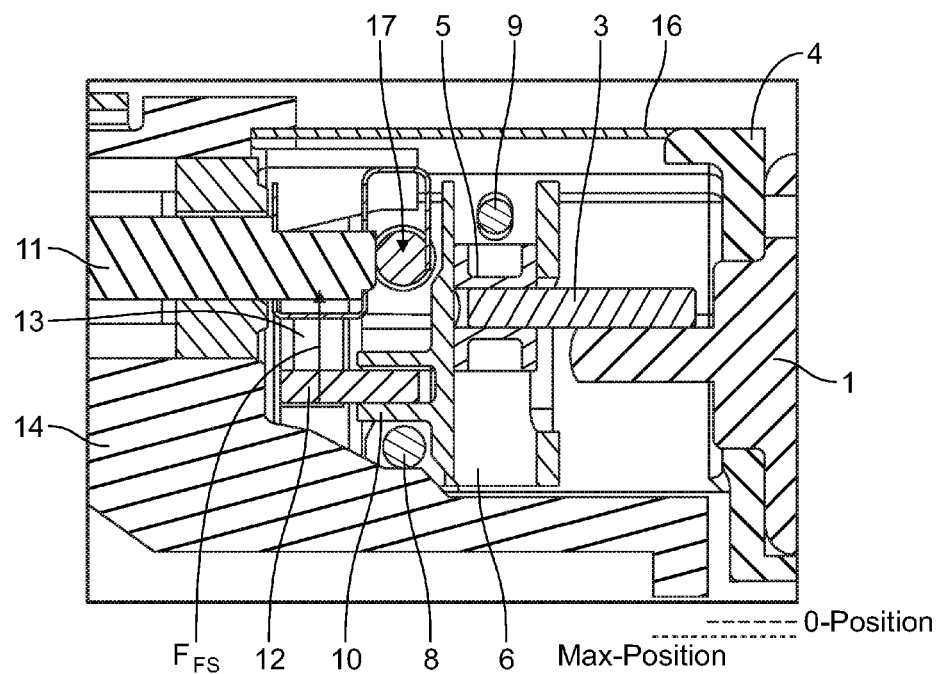
FIG. 2 shows a sectional view of a detail of the device of FIG. 1.

As can be seen in FIG. 1, the drive shaft 2 of the motor 1 defines the first rotary axis I. In the position of the rocker frame 14 as shown in FIG. 2 a second rotary axis II defined by the driven shaft 11 extends in parallel to the first rotary axis I. A third axis III is defined by the sliding support 6 within the cross slider 7. The third axis III is perpendicular to the first rotary axis I. A fourth axis IV is defined by bar 8 and is parallel to bars 5 and 17. The fourth axis IV is perpendicular to the first rotary axis I and perpendicular to the third axis III.

Figure 3A:
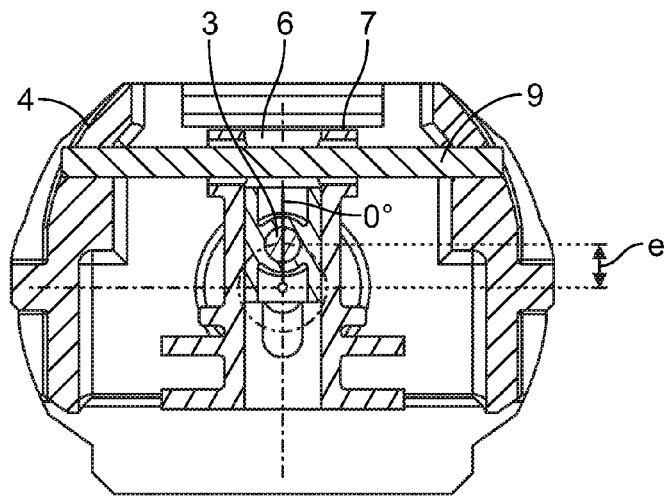
FIG. 3a, b show further sectional views of the device of FIG. 1 in different positions.
Figure 3B:
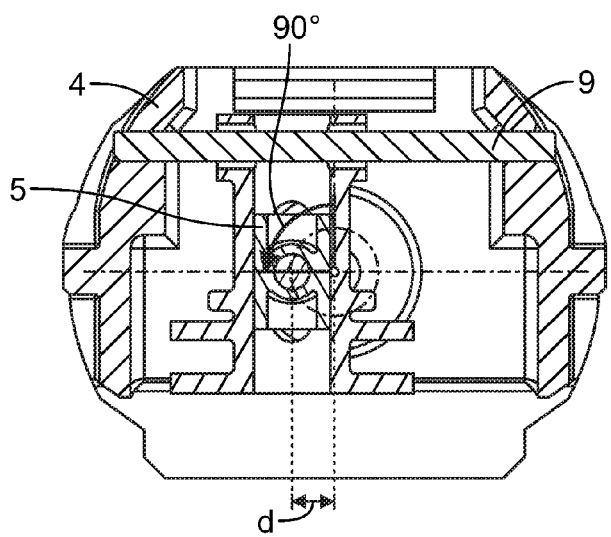
Figure 4:
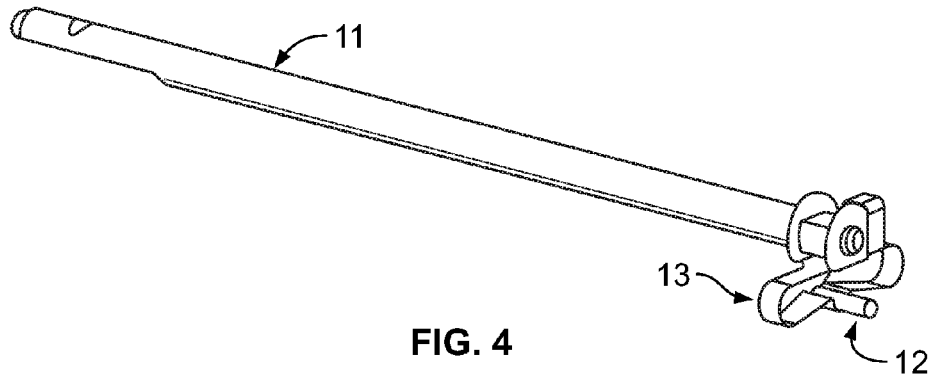
FIG. 4 shows a perspective view of a detail of the device of FIG. 1.

In the following, operation of the device is explained in more detail with reference to FIGS. 2, 3a, 3b, 5a, 5b, 7a and 7b. FIGS. 3a and 3b depict different positions of the sliding block 5 and the cross slider 7 during operation of the motor 1. FIGS. 2 and 3a shows a first position of the drive shaft 2 and its eccentric pin 3. In this first position, sliding block 5 is located near bar 9 within sliding support 6. Further, cross slider 7 is in a center position with the third axis III of the sliding support 6 crossing the first rotary axis I. In FIG. 3b motor 1 rotated drive shaft 2 by 90° as indicated by an arrow depicting the movement of pin 3. By this rotation of pin 3 about the first rotary axis I, sliding block 5 is displaced within sliding support 6 away from bar 9. In addition, cross slider 7 is displaced to the left as seen in FIG. 3b. Summarizing, rotation of motor 1 causes an oscillating sinusoidal side to side motion of cross slider 7 by means of the first transmission stage.

Figure 5A:
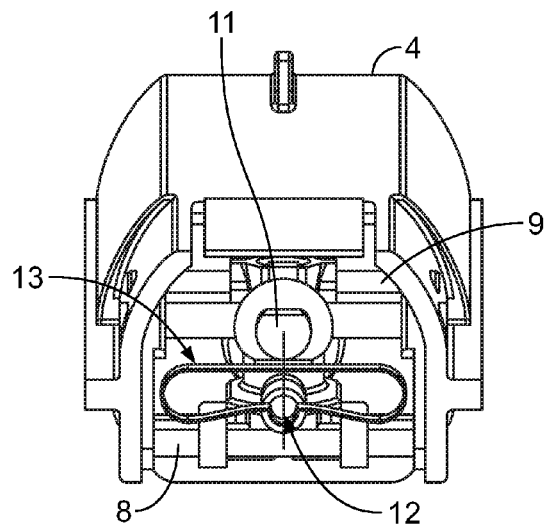
FIGS. 5a, b show further sectional views of the device of FIG. 1 in different positions.
Figure 5B:
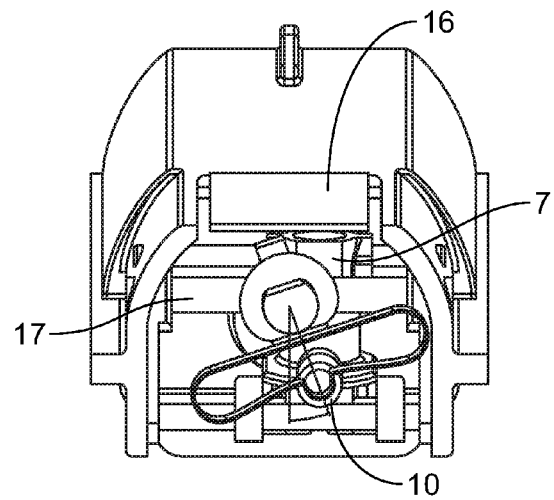

This oscillating side to side motion of cross slider 7 causes an oscillating pivoting of driven shaft 11 by means of the second transmission stage. This is depicted in FIGS. 5a and 5b, wherein FIG. 5a corresponds to the position of the motor 1 shown in FIG. 3a and FIG. 5b corresponds to the position of the motor 1 shown in FIG. 3b. Due to the offset of pin 12 with respect to driven shaft 11 the side to side motion of cross slider 7 causes the driven shaft 11 to rotate about the second rotary axis II. This can be seen comparing FIGS. 5a and 5b, wherein lateral displacement of the link 10 of the cross slider 7 results in a rotary motion of the driven shaft 11 due to the coupling of the link 10 and the counter link 12 and the yoke spring 13.

The angular velocity of the driven shaft 11 has a maximum at 0° and 180° of the rotation of the drive pin 3. This angular velocity may even exceed the angular velocity of a pure sinusoidal movement. Especially, the velocity of driven shaft 11 in a range between about 30° prior and after a middle position is increased which may have benefits resulting e.g. from a higher speed of bristles of a toothbrush. This may cause a better cleaning result and a better sensation of the bristles for a user. The second derivative of the angle of rotation psi of the driven shaft 11 over time is the angular acceleration. The angular acceleration of the driven shaft 11 of the present device has improved values compared with conventional devices and compared with a pure sinusoidal movement, too. Especially the maximum of the angular acceleration may be reduced, e.g. to 2.436 rad/sec$^2$, which is about 10% below the value for a pure sinusoidal movement. This results in lower inertia forces and a smoother and quieter movement of the driven shaft 11.

In addition, lateral displacement of the link 10 of the cross slider 7 results in a force $F_X$ acting on the driven shaft 11 and the rocker frame 14. For example, the biasing force $F_Y$ of the spring is larger than the force $F_X$ generated during rotation of motor 1. In other words, the rocker frame 14 is held in abutment with the first stop 8 if no external force is exerted on the driven shaft 11. That is, the rocker frame 14 is held in its zero position shown in FIG. 2. However, if a user exerts a force in the magnitude between the lower threshold and the upper threshold on the driven shaft 11, for example a contact pressure during use of a toothbrush, the rocker frame 14 is allowed to float between the first stop 8 and the second stop 17. During this floating state or position, the force $F_X$ acting on the driven shaft 11 causes a pulsating swiveling motion of the driven shaft 11 resulting in a 3D motion of the driven shaft 11.

Figure 8:
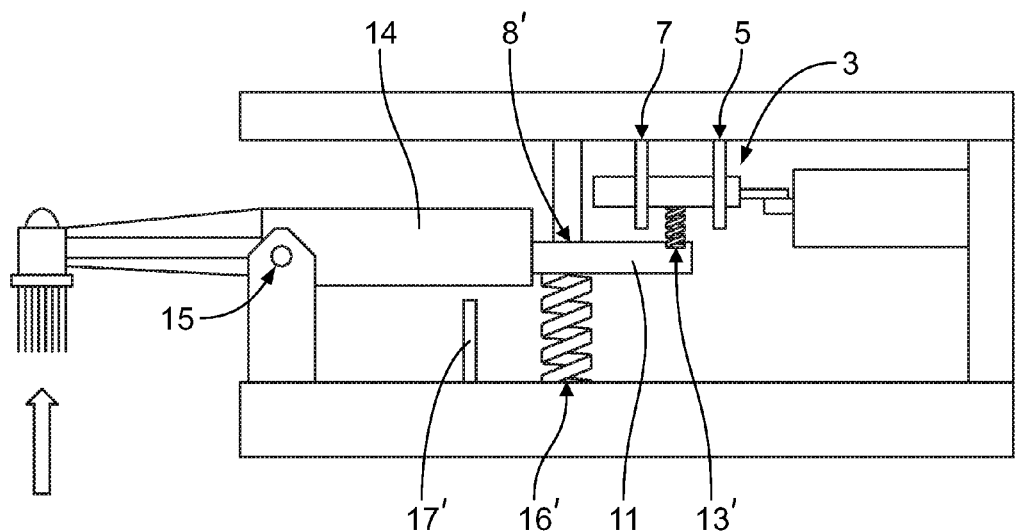
FIG. 8 shows a schematic view of a device according to a second embodiment.

The working principle of generating such a 3D motion of the driven shaft 11 is depicted in FIG. 8, too. In this schematic example leaf spring 16 is replaced by a coil spring 16' and yoke spring 13 is replaced by a further coil spring 13'. As can be seen in FIG. 8, a pulsating force $F_X$ acting on the driven shaft 11 and the rocker frame 14 results in a pulsating swiveling motion of the driven shaft 11 only if a force applied by a user (indicated by an arrow in FIG. 8) exceeds an lower threshold allowing the rocker frame 14 to lose contact with the first stop 8' and is below an upper threshold such that the rocker frame 14 does not contact the second stop 17'.

Taking into account that the value of the pulsating force $F_X$ acting on the driven shaft 11 and the rocker frame 14 varies during rotation of motor 1, swiveling of the rocker frame 14 may occur with a small amplitude if the force exerted by the user is near the lower threshold, i.e. the rocker frame 14 loses contact with the first stop only at or near the peak of $F_X$ but remains in abutment with the first stop if the force $F_X$ is near the value zero. In a similar way the amplitude of the swiveling motion of the rocker frame 14 is reduced if the force exerted by the user is near the upper threshold, i.e. the rocker frame 14 comes in abutment with the second stop at or near the peak of $F_X$ but remains in floating between the first stop and the second stop if the force $F_X$ is near the value zero. This may be used to provide a feedback to the user whether or not the contact pressure applied by the user is within an intended or a desired range.

Figure 9:
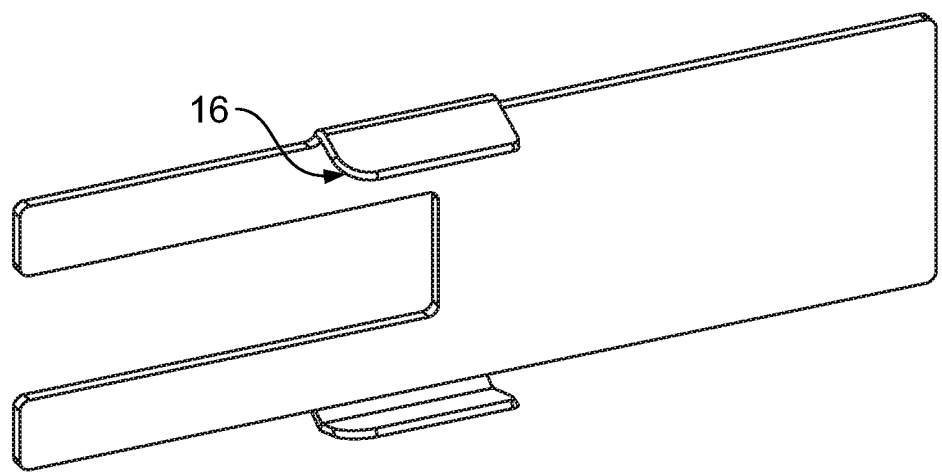
FIG. 9 shows a perspective view of the leaf spring of the device of FIG. 1.

FIG. 9 shows an example of the design of leaf spring 16. The leaf spring 16 has a generally rectangular shape with a fork-like configuration at one end for attachment of the leaf spring 16 with the rocker frame 14. The leaf spring 16 further comprises two lateral latches extending from the mainly rectangular plate with an angle of about 80° to 95°. The lateral latches increase the stiffness of leaf spring 16 such that the spring stiffness is mainly defined by the flat end of the leaf spring 16 which is not provided with latches and faces away from the fork-like end. This configuration of the leaf spring 16 has the benefit that the leaf spring may be mounted into the device by inserting after further component parts of the device have been assembled.

Figure 10:
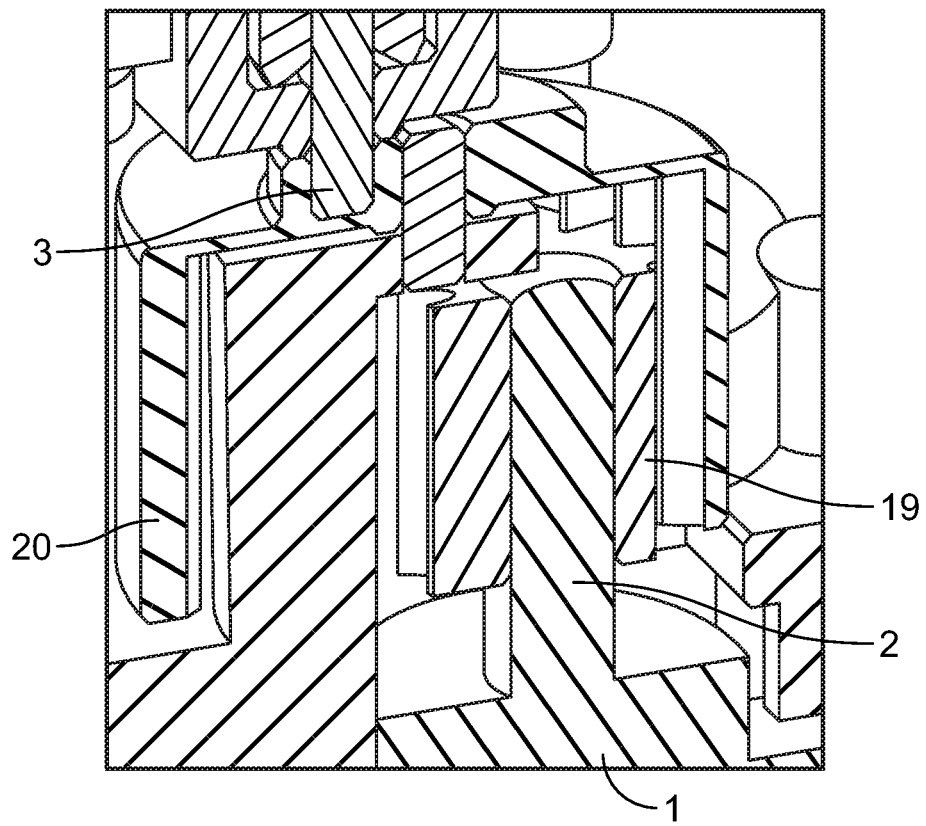
FIG. 10 shows a further embodiment of the drive pin coupled to the drive shaft by means of a gearing mechanism.

FIG. 10 shows an alternative arrangement of the drive pin 3 with respect to the drive shaft 2 of the motor 1. In this embodiment a further gear mechanism is interposed between the drive shaft 2 and the drive pin 3. In more detail, a pinion 19 is provided on the drive shaft 2 meshing with a ring gear 20 which in turn carries the drive pin 3. The gear ratio between the drive shaft 2 and the drive pin 3 may be adapted as required, e.g. depending from the torque and/or voltage of the motor 1.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An electrically driven device comprising
a housing (4),
an electric motor (1) with a drive shaft (2) having a first rotary axis (I) and a drive pin (3) connected to the drive shaft (2) eccentrically with respect to the rotary axis (I),
a driven shaft (11) having a second rotary axis (II) and mounted in the housing (4) for performing a pivoting about the second rotary axis (II),
wherein the driven shaft (11) is indirectly coupled to the drive pin (3) by a gear mechanism converting a rotary motion of the drive shaft (2) into a reciprocating pivoting of the driven shaft (11), the gear mechanism comprising an elastically deformable transmission member (13) rigidly attached to the driven shaft 11,
wherein the gear mechanism comprises a first transmission stage and a second transmission stage, wherein the first transmission stage comprises
a cross slider (7) having a sliding support (6) which extends perpendicular to the first rotary axis (I) and which receives the drive pin (3) either directly or by means of a sliding block (5) having a bearing receiving the drive pin (3), wherein the cross slider (7) is axially guided in the housing (4) to be movable in an axial direction perpendicular to the first rotary axis (I) and perpendicular to the extension (III) of the sliding support (6), and
a link (10) located offset with respect to the second rotary axis (II) and connecting the cross slider (7) to the elastically deformable transmission member (13), and
wherein the second transmission stage comprises the elastically deformable transmission member (13) and a counter link (12) located offset with respect to the second rotary axis (II) and connected to the link (10).

2. The electrically driven device according to claim 1, wherein the elastically deformable transmission member is a yoke spring (13) rotationally constrained to the driven shaft (11).

3. The electrically driven device according to claim 2, wherein the counter link is a pin (12) constrained to the yoke spring (13) and that the link (10) is a bearing cup receiving the pin (12).

4. The electrically driven device according to claim 1, wherein the cross slider (7) is displaceably mounted in the housing (4) by means of at least two stationary bars (8, 8'; 9) extending perpendicular to the first rotary axis (I) and perpendicular to the extension (III) of the sliding support (6).

5. The electrically driven device according to claim 4, wherein one of the stationary bars (8, 8'; 9) is the first stop.

6. The electrically driven device according to claim 1, wherein the cross slider (7) has a cylindrical opening defining the sliding support (6) of the sliding block (5) with a long hole provided in the sliding support (6) receiving the drive pin (3).

7. The electrically driven device according to claim 1, wherein the driven shaft (11) is pivotably mounted in the housing (4) by means of a rocker frame (14) which is pivotable with respect to the housing (4) about a pivoting axis (IV) which is perpendicular to the first rotary axis (I) and perpendicular to the extension (III) of the sliding support (6).

8. The electrically driven device according to claim 7, wherein an elastically deformable element (16) is provided between the housing (4) and the rocker frame (14) biasing the rocker frame (14) into a rest position in which the rocker frame (14) abuts a first stop (8, 8') preventing pivoting of the rocker frame (14) into a first direction.

9. The electrically driven device according to claim 8, wherein a second stop (9, 9') is provided limiting pivoting of the rocker frame (14) into a second direction which is opposite to the first direction.

10. The electrically driven device according to claim 9, wherein the second stop is a bar (9, 9') which is located at the end of the driven shaft (11) facing towards the motor (1) and which is constrained to the housing (4).

11. The electrically driven device according to claim 8, wherein axial movement of the cross slider (7) generates an intermittent force ($F_x$) in a direction perpendicular to the axial movement of the cross slider (7) which intermittent force ($F_x$) is transmitted to the rocker frame (14) via the elastically deformable transmission member (13) and the driven shaft (11), with the intermittent force ($F_x$) biasing the rocker frame (14) away from the rest position.

12. The electrically driven device according to claim 11, wherein the biasing force ($F_y$) of the elastically deformable element (16) exceeds the intermittent force ($F_x$) generated by the motion of the cross slider (7).

13. The electrically driven device according to claim 12, wherein the rocker frame (14) is in a pulsating position between the first stop (8, 8') and the second stop (9, 9') if a user force is exerted on the driven shaft (11) with a magnitude between an upper threshold and a lower threshold.

14. The electrically driven device according to any of claim 8, wherein the device further comprises at least one sensor detecting contact of the rocker frame (14) with one of the first stop (8, 8') and the second stop (9, 9').

15. The electrically driven device according to claim 1, wherein the first transmission stage of the gear mechanism converts a continuous rotary motion of the drive shaft (2) into a sinusoidal reciprocating displacement of the cross slider (7).

\* \* \* \* \*